(12) United States Patent
Paskov et al.

(10) Patent No.: US 10,040,430 B2
(45) Date of Patent: Aug. 7, 2018

(54) ENHANCED VEHICLE WIPER BLADE SYSTEM

(71) Applicants: Pasko Todorov Paskov, Varna (BG); Stanyu Dimitrov Stoykov, Sofia (BG); Svilen Evgeniev Konstantinov, Varna (BG); Rositsa Dimitrova Stoykova, Varna (BG)

(72) Inventors: Pasko Todorov Paskov, Varna (BG); Stanyu Dimitrov Stoykov, Sofia (BG); Svilen Evgeniev Konstantinov, Varna (BG); Rositsa Dimitrova Stoykova, Varna (BG)

(*) Notice: Subject to any disclaimer, the term of this patent is extended or adjusted under 35 U.S.C. 154(b) by 518 days.

(21) Appl. No.: 14/110,261

(22) PCT Filed: Sep. 18, 2013

(86) PCT No.: PCT/BG2013/000044
§ 371 (c)(1),
(2) Date: Jul. 29, 2015

(87) PCT Pub. No.: WO2014/043769
PCT Pub. Date: Mar. 27, 2014

(65) Prior Publication Data
US 2015/0082573 A1    Mar. 26, 2015

(30) Foreign Application Priority Data
Sep. 20, 2012  (BG) .......................... 111311

(51) Int. Cl.
*B60S 1/48*      (2006.01)
*B60S 1/52*      (2006.01)
*B60S 1/56*      (2006.01)
*B60S 1/38*      (2006.01)

(52) U.S. Cl.
CPC ............ *B60S 1/488* (2013.01); *B60S 1/487* (2013.01); *B60S 1/52* (2013.01); *B60S 1/524* (2013.01); *B60S 1/56* (2013.01); *B60S 2001/3839* (2013.01)

(58) Field of Classification Search
CPC .......... B60S 1/487; B60S 1/488; B60S 1/524
USPC ....................... 15/250.05–250.09
See application file for complete search history.

(56) References Cited

U.S. PATENT DOCUMENTS 5,383,247 A * 1/1995 Nickel ................. B60S 1/488
                                                      15/250.01
5,862,567 A * 1/1999 Kim ..................... B60S 1/32
                                                      15/250.201
2004/0226127 A1* 11/2004 Kaplan .................. B60S 1/488
                                                      15/250.04

(Continued)

FOREIGN PATENT DOCUMENTS

CA         2807317 A1 * 10/2011 ............. B60S 1/381

*Primary Examiner* — Andrew A Horton
(74) *Attorney, Agent, or Firm* — Gerald R. Black, Esq.

(57) ABSTRACT

A vehicle cleaning system in which washer fluid is dispensed onto a vehicle windshield or headlight wiper blade via an integral channel and nozzles arrayed in a way so as to insure efficient dispensation of cleaning solution onto the vehicle windshield or headlight. The vehicle cleaning system comprises a fluid reservoir, an element to heat the fluid based on outside ambient temperature, a valve which regulates the fluid flow creating a hammering action during fluid application, and a surface wiper with an integral fluid dispensing apparatus.

20 Claims, 7 Drawing Sheets (56) References Cited

U.S. PATENT DOCUMENTS

| | | | |
|---|---|---|---|
| 2008/0263806 A1* | 10/2008 | Egner-Walter | B60S 1/386 15/250.01 |
| 2009/0014035 A1* | 1/2009 | Franco | B60S 1/482 134/19 |
| 2010/0037415 A1* | 2/2010 | Lansinger | B60H 1/00271 15/250.01 |

* cited by examiner

FIGURE 5
WINDSHIELD WIPER

FIGURE 8
Section B-B

ENHANCED VEHICLE WIPER BLADE SYSTEM

CROSS-REFERENCE TO RELATED APPLICATIONS

This U.S. Patent Application is related to and claims priority to the Patent issued from the Patent Department of Republic of Bulgaria, Bulgarian Patent Registration No. 111311, filed on Sep. 20, 2012, by Pasko Todorov Paskov, Svilen Evgeniev Konstantinov, Rositsa Dimitrova Stoykova, and Stanyu Dimitrov Stoykov, and U.S. Provisional Application No. 61/850,750, filed on Feb. 23, 2013, by Pasko Todorov Paskov, Svilen Evgeniev Konstantinov, Rositsa Dimitrova Stoykova, and Stanyu Dimitrov Stoykov; and PCT/BG2013/000044, filed Sep. 18, 2013 by Pasko Todorov Paskov, Svilen Evgeniev Konstantinov, Rositsa Dimitrova Stoykova, and Stanyu Dimitrov Stoykov.

FIELD OF USE

The present invention relates to a windshield or headlight wiper blade in which the washer fluid is applied via integral nozzles mounted into, or molded as an integral part of the wiper blade with a wiper fluid heating element mounted inline between the reservoir and the wiper blade to supply heated cleaning fluid adjusted for outside ambient temperature.

BACKGROUND OF THE INVENTION

Ensuring that the driver can see road conditions, oncoming traffic, pedestrians, and other obstacles is of paramount importance to the safe operation of any vehicle.

Prior approaches have the washer fluid nozzle located on the wiper arm, instead of being an integral part of the wiper blade itself, while others have the washer nozzles which are located on the hood of the vehicle. Both approaches use more fluid. In addition, the fluid is prone to freezing in cold temperatures as temperatures drop. Also, the spraying of the fluid across the windshield is not uniform, leading to over-spraying some portions while under-spraying other portions.

U.S. Pat. No. 6,804,854 (Hasegawa; et al.) discloses an arm head of a windshield wiper device is provided on a backside thereof with an undulated groove formed by sidewalls. The sidewalls have plural hill portions protruding in opposite directions alternately in a width direction of the arm head so as to be opposed to one another in a longitudinal direction thereof. The tops of the hill portions on one width side of the arm head are integrally provided at upper surfaces thereof with projections extending perpendicularly to a depth direction of the groove to overhang the groove.

U.S. Patent Document No. 20120284948 (Guidez) discloses a motor vehicle windshield wiper, comprising a windshield wiper blade that is hinged onto a windshield wiper arm by means of an arm/blade connector; and a washing liquid-spraying device that is arranged on the windshield wiper blade and connected by means of a connecting device to a washing liquid delivery channel that extends at least partially along the windshield wiper arm.

U.S. Patent Document No. 20120291216 (Schauble; et al.) discloses a wiper device for vehicle windows and wiper blade with a heating arrangement. The wiper device is for vehicle windows, in particular for vehicle windscreens, with a wiper arm which carries an adapter on the wiper arm side, which is able to be connected with a wiper blade by means of an adapter element on the wiper blade side, wherein the wiper blade has a wiper rubber and at least one carrier rail arranged in the longitudinal direction of the wiper blade, which is arranged in operative connection with a heating arrangement having an electrical connection.

U.S. Patent Document No. 20120297564 (Jeuffe; et al.) discloses a windscreen wiper blade having a built-in washer liquid conduit. The system relates to a windshield wiper blade of a motor vehicle, comprising an elongate flexible strip, wherein at least one end of the strip is covered by a cap with a built-in conduit provided with a nozzle offset on the side of the flexible strip relative to the longitudinal median plane of said flexible strip.

What is needed is an enhanced windshield or headlight wiper system with an integral washer fluid dispensing system and a fluid heating element; dispersion of fluid under high pressure and in close proximity to the surface to be cleaned, ensuring efficient cleaning and removal of stubborn stains. What is needed is a vehicle windshield or a headlight wiper and cleaning system designed to remove rain and debris from a windshield or a headlight in all types of motor vehicles operating at temperatures as low as −40° C. without freezing even in the harshest winter conditions.

What is needed is a formation of partially closed area between the wiper blade and the surface being cleaned, ensuring an even distribution of the cleaning solution across the surface being cleaned; the presence of the heating system throughout the wiper blade enables the application of heated fluid or steam to the wiper ensuring efficient cleaning in extreme weather conditions.

SUMMARY OF THE INVENTION

The enhanced vehicle windshield wiper system of the present invention addresses these needs.

The enhanced vehicle windshield wiper system of the present invention is for cleaning a vehicle windshield or headlights.

The wiper system of the present invention comprises a reservoir for storing cleaning solution, an integral fluid channel through which said cleaning solution is channeled upon activation, a pump which applies pressure to said cleaning solution moving said cleaning solution into and through nozzles in a wiper blade, a cleaning solution heating element which heats said cleaning solution based upon ambient temperature, a valve which regulates the flow of said cleaning solution to ensure a hammering action of said cleaning solution upon activation, and a plurality of nozzles disposed in said wiper blade. The plurality of nozzles is generally evenly spaced along the length of the wiper blade to provide an even distribution of cleaning solution across the surface to be cleaned.

Upon activation of the enhanced vehicle windshield wiper system of the present invention, the cleaning solution is applied to the vehicle windshield or headlights by a hammering action to remove debris and stains from the vehicle windshield or headlights. Upon activation of said enhanced vehicle windshield wiper system, vaporized fluid is channeled through the plurality of nozzles onto the vehicle windshield or headlights.

For purposes of illustration, the system of the present invention is depicted in a mechanism for cleaning debris from windshield. However, it will be readily appreciated by those skilled in the art that the system of the present invention has numerous other applications, including particularly, cleaning debris from the headlights of a vehicle.

In addition, for a complete understanding of the enhanced wiper system of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE PREFERRED EMBODIMENTS

Figure 1:
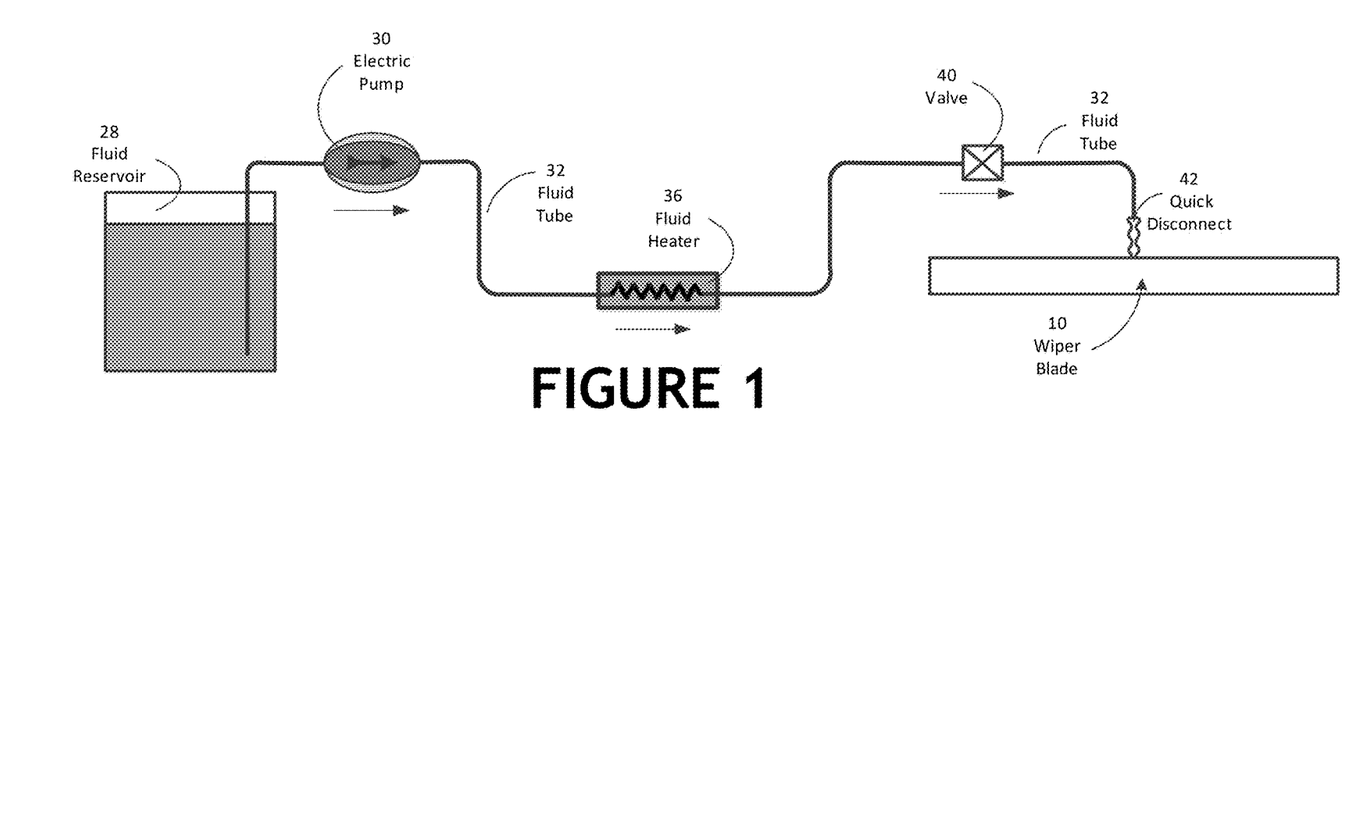
FIG. 1 depicts a schematic of the enhanced vehicle wiper blade system of the present invention, including the fluid reservoir, the electric pump, the fluid tube, fluid heater, the valve, and the quick disconnect.

Referring now to the drawings, FIG. 1 depicts the block diagram of enhanced vehicle wiper blade system of the present invention. The wiper blade system comprises the fluid reservoir [28], electric pump [30] which pulls the fluid from the reservoir [28] and pushes it through the fluid tube [32]. The cleaning fluid passes through a fluid heater [36] where the cleaning fluid is heated, if necessary to the proper temperature based upon outside temperature. The cleaning fluid then passes through the valve [40], into the windshield wiper [10] which is connected to the fluid tube [32] via the quick disconnect [42], through the nozzles [20 and 22] for the integral nozzles in FIG. 2, and onto the windshield or headlight surface to be cleaned.

FIGS. 2-5 depict an assortment of exploded views of a first preferred embodiment of the enhanced vehicle wiper blade of the present invention, showing the passages whereby the cleaning fluid is pulsed onto the surface to be cleaned, delivering a pulsed and hammering effect to clean the surface.

Figure 2:
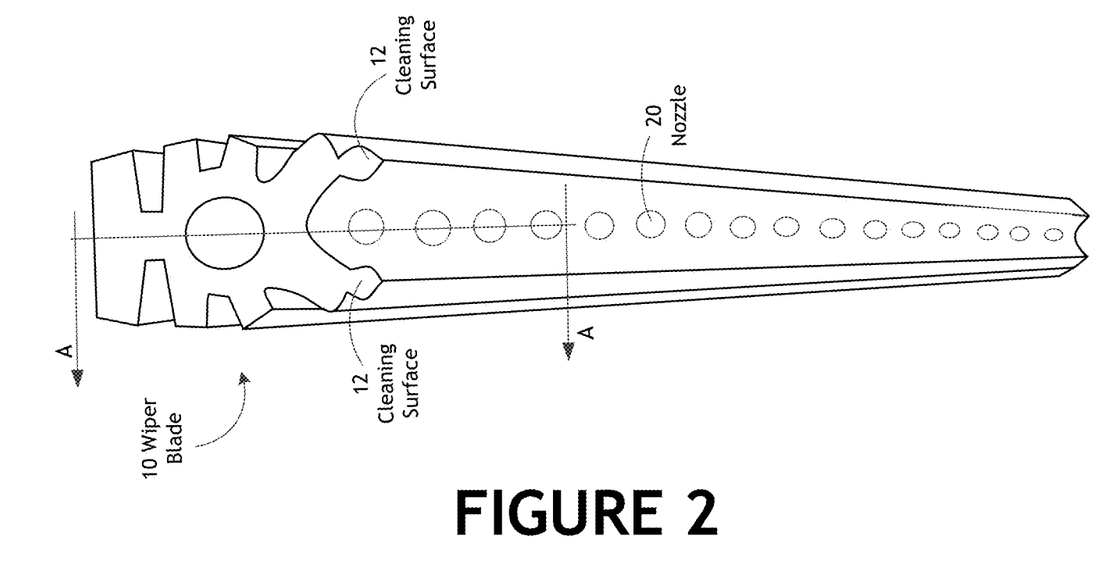
FIG. 2 depicts an isometric view of the underside of a first preferred embodiment of the enhanced vehicle wiper blade of the present invention, showing the passages whereby the cleaning fluid is pulsed onto the surface to be cleaned, delivering a hammering effect to clean said surface.
Figures 3, 4:
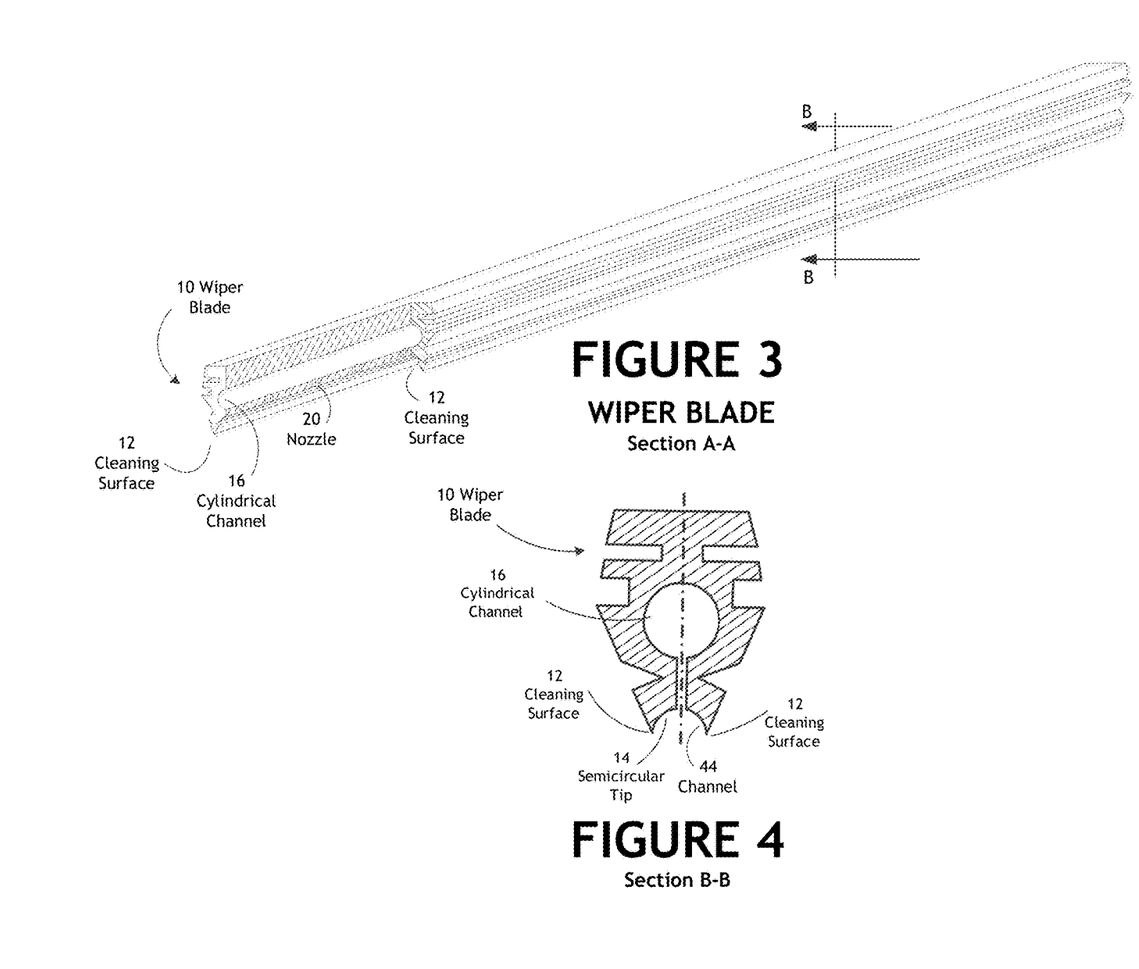
FIG. 3 depicts a partial sectional view of the enhanced vehicle wiper blade of FIG. 2.
FIG. 4 depicts a cross-sectional view of the preferred embodiment of the enhanced vehicle wiper blade of the present invention of FIG. 3.

FIG. 3 is the elevational view of the first embodiment in FIG. 2 with a partial cross-section, wherein the nozzles [20, 22] are clearly visible as well as the two cleaning edges [12], and the channel [44] in between the edges. The cylindrical channel [16] feeds cleaning solution into and through the fluid spray nozzles [20] which are spaced at generally evenly-spaced intervals along the cleaning edge of the wiper blade [10]. The spray nozzles [20] are normally closed and open as pressurized cleaning solution is circulated through them.

The nozzle [20] provides an essentially triangular shaped spray which is attached to the wiper blade [14] and is in fluid communication with the cylindrical channel [16]. The nozzle is preferably about 2.5 mm tall, about 1.6 mm wide, about 2 mm wide at its widest point, with the channel [16] preferably having a generally cylindrical shape being disposed in the substantially in the middle of the wiper blade [10]. The nozzle [20] is preferably about 1.2 mm at its widest at the top and tapers to about 0.2 mm at its outlet.

Figure 5:
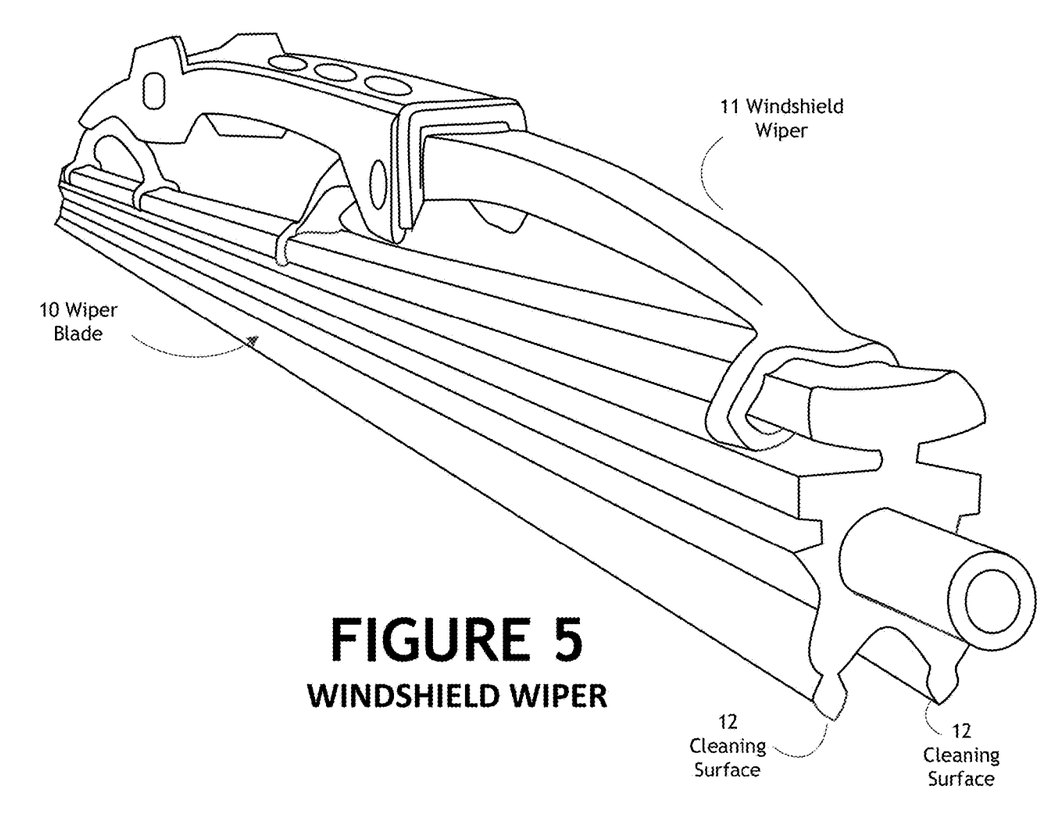
FIG. 5 depicts an isometric view of the first preferred embodiment of the enhanced vehicle wiper blade of FIG. 2 attached to a windshield wiper.

FIG. 5 depicts the enhanced vehicle windshield wiper system of the present invention comprising a standard wiper arm motor and arm assembly. The windshield wiper [10] has a hollow channel [16], wherein the cleaning solution is routed through via nozzles [20] which are generally spaced at generally equal intervals along the wiper blade. The nozzles [20] are designed to be closed under normal driving conditions and to open when cleaning solution, under pressure, is forced through them. When the cleaning function is activated, the cleaning solution is circulated through the hollow channel [16] onto the windshield wiper [10] under high pressure and out of the nozzles [20], thus opening the nozzles [20] and spraying the cleaning solution onto the cleaning surface as desired by the vehicle operator. The nozzles [20] are positioned along the length of the windshield wiper [10] on the side which faces away from the vehicle driver and passenger.

FIG. 5 depicts a cross-sectional view of the windshield wiper blade of FIG. 4. The windshield wiper blade [10] comprises two cleaning surfaces [12] while the contour of its cross section which connects the vertices of the two edges forms a semicircle [14]. Running through the center of the blade, is a cylindrical channel [16] in which the fluid flows through. The top of the wiper blade [10] is preferably about 8.2 mm in width, with the top width of the cleaning surfaces is about 9 mm tapering down to 7 mm, then 5.4 mm. The height of the wiper blade [10] is preferably about 12.2 mm from the semi-circular tip [14] to the top surface of the blade. The radius of the semi-circular tip [14] is preferably about 4.5 mm.

Figure 6:
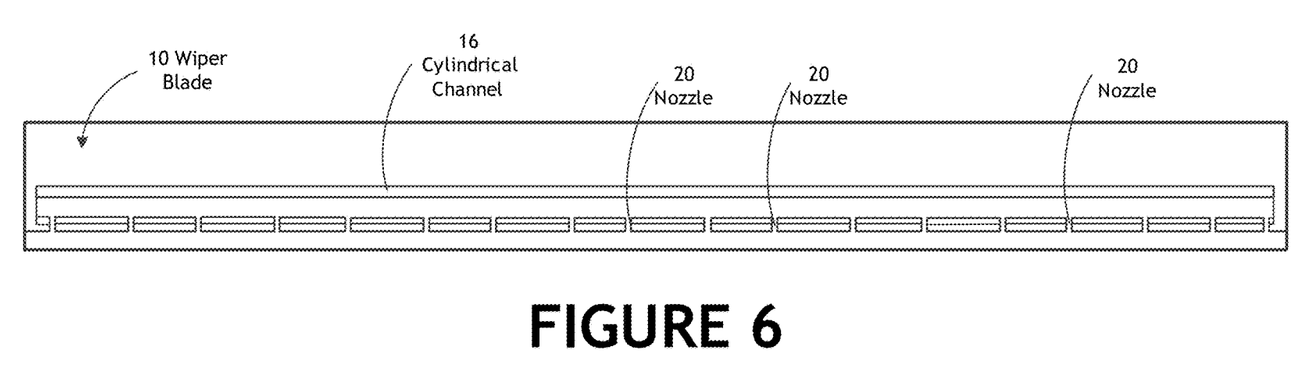
FIG. 6 depicts a side elevational view of a second preferred embodiment of the enhanced vehicle wiper blade of the present invention.

FIG. 6 depicts a side elevational view of a second preferred embodiment of the enhanced vehicle wiper blade of the present invention.

Figure 7:
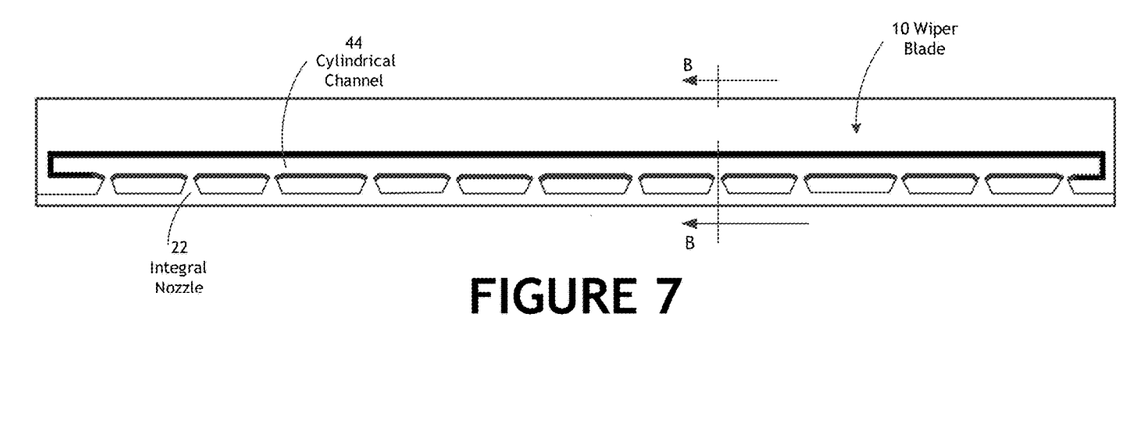
FIG. 7 depicts a side elevational view of a third preferred embodiment of the enhanced vehicle wiper blade of the present invention.

FIG. 7 depicts a third preferred embodiment of the windshield wiper blade [10] of the present invention in which the fluid flows through the cylindrical channel [16] which is disposed in the center of the blade and onto the surface to be cleaned via integral nozzles [22] which are spaced at regular intervals along the cleaning edge of the windshield wiper blade [10]. The integral nozzles [22] are hemispherical in shape with the openings having a conical shape to improve spreading the liquid over a larger area, improving cleaning ability, while using up to 30-40% less fluid as compared to other systems. Activation of the integral nozzles [22] is via pressurized fluid during use. The nozzles [22] remain closed when the system is not activated.

In this embodiment, the cylindrical cavity [16] which comprises the channel in the center of the wiper blade [10] from which the cleaning solution is then sprayed onto the vehicle windshield or headlight, is molded with integral nozzles so as to reduce production times and cost. The nozzles [22] are preferably hemispherical in shape so as to improve the concentration of the cleaning solution stream, while the conical shape of the opening aids in spreading the cleaning solution across a larger area.

Also, the valve [40] enables a better distribution of the cleaning solution being sprayed across the windshield or headlight. The valve [40] also enables a hammering action of the cleaning solution upon activation, enabling a more efficient cleaning by increasing pressure. As a result of use of the valve [40], it is estimated there will be a 30-40% savings in cleaning solution as compared with conventional systems.

The cleaning surface [12] is split into two surfaces, leaving a space between, creating a channel [44] into which the nozzles [20] inject the cleaning solution. This channel [44] enables the efficient cleaning of the windshield by preventing the cleaning solution from blowing away under high vehicle speeds, reducing the amount of cleaning solution used. The distance of the nozzles [20] from the windshield in this channel [44] is 3-4 mm.

The windshield wiper blade has two cleaning edges [12], with an attachment at one end for the fluid pipe, which is located inside the wiper blade. The wiper blade [10] is connected to the fluid reservoir [28], electric pump [30], and fluid heater [36]. The fluid heater [36] raises the temperature of the cleaning solution, based on outside temperature, perhaps even to a vaporized state, as the cleaning solution flows out of the reservoir and into the cavity into the wiper blade. The system uses a temperature sensor mounted outside the vehicle, or an existing temperature sensor in the vehicle engine compartment, or elsewhere in the vehicle to determine outside ambient temperature and adjust the washer fluid temperature accordingly.

Figure 8:
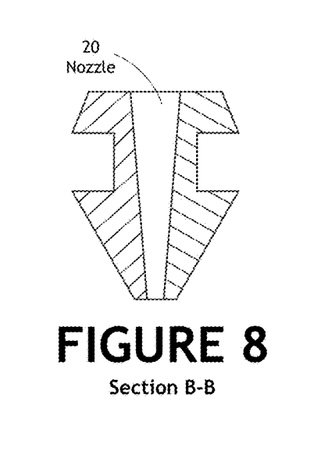
FIG. 8 depicts an exploded sectional detailed view of a nozzle of the enhanced vehicle wiper blade of the present invention.

FIG. 8 depicts an exploded detailed sectional view of a typical nozzle of the enhanced vehicle wiper blade of the present invention.

Figure 9:
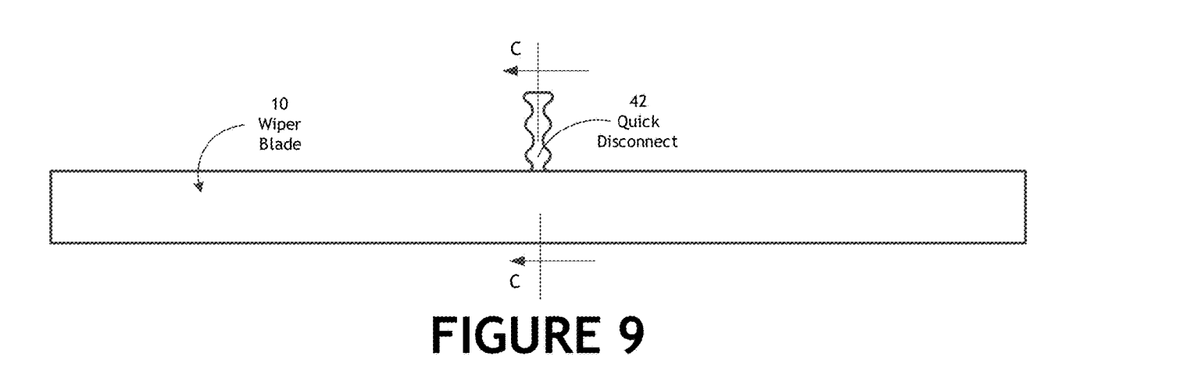
FIG. 9 depicts another view of the enhanced vehicle wiper blade of FIG. 1, showing the quick disconnect that enables easy removal for servicing and replacement.
Figure 10:
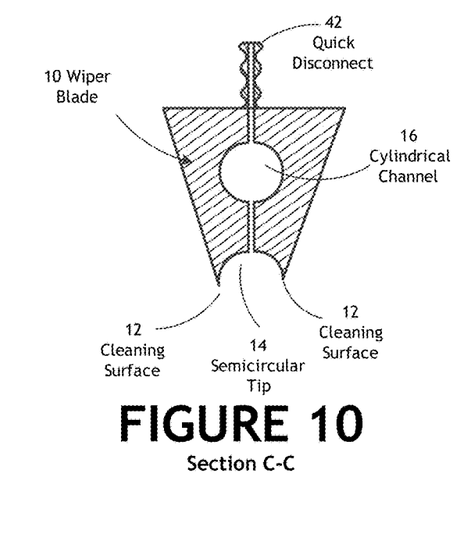
FIG. 10 depicts a cross-sectional view of the windshield wiper blade and the quick disconnect taken from FIG. 9.

FIG. 9 depicts another preferred embodiment of the enhanced vehicle wiper blade of the present invention, showing the quick disconnect [42] that enables easy removal for servicing and replacement. FIG. 10 depicts a cross-sectional view of the windshield wiper blade and the quick disconnect taken from FIG. 9.

A valve [40] is included which activates the cleaning solution to create a hammering action, aiding in cleaning and regulating the amount of the liquid or vaporized cleaning solution which is channeled through the nozzles onto the vehicle windshield or headlights. A quick disconnect [42] enables the enhanced windshield wiper blade assembly of the present invention [10] to be easily removed for servicing and replacement.

A heater [36] enables a vaporization of the fluid in instances where steam is needed, such as in harsh winter conditions in which there is heavy ice buildup, or the cleaning of dead insects on the windshield or headlight.

For the most efficient operation of the enhanced vehicle wiper blade system of the present invention, it is recommended that the following ranges and parameters be used. The pressure of the liquid into the reservoir is between 1.5 and 2.5 bars and preferably about 2.0 bars, which is also the pressure of the operational system while in the working regime of hot cleaning solution. The temperature of the liquid cleaning solution initially varies between 35° C. and 55° C., and preferably in the range of 40° C. to 50° C., when the cleaning solution flows out of the nozzles because of the differences in diameters of feeding pipe and nozzles the pressure increases two to three times (to about 4-6 bars). This is the working pressure of the system on the cleaning surface.

Adding the valve [40] into the system provides two additional advantages:
breaking up the flow of the liquid and delivering the "hammer effect" of pulses (3-5 pulses per/sec) increases the cleaning effect onto the surface to be cleaned; and
preserving the amount of cleaning solution because of the working regime of the valve [40] and regulated the time of opening and closing define the flow rate of the cleaning solution.

When the system is in working regime the vaporized cleaning solution will be in the temperature range of 100° C. and 118° C., and preferably between 105° C. and 110° C. The pressure on the cleaning surface will preferably be 1 Bar=1 kg/cm$^2$, adding the diameter of the nozzle with pressure of 4 Bar=4 kg/cm$^2$, or 0.04 kg/mm$^2$.

Also, the wiper blade [10] is preferably a rubber or rubber-like material and is the same color as the body of the vehicle. That is, for example, a red-colored wiper blade is used to match a red vehicle. This will enhance the marketing of the windshield wiper of the present invention.

In addition, a heavy-duty motor and gear reduction system is recommended in extreme weather conditions, to ensure that the wiper blades have sufficient power to overcome any build-up of snow and sleet on the surface to be cleaned.

The system may be part of a vehicle as supplied by an OEM or sold in kit form so as to enable aftermarket installation onto any vehicle in 45-50 minutes by someone skilled in the art. The kit comprises; two wiper blades, a heater element with valves, an electronic control unit, installation wires, a new fluid tube, mounting plates and instruction manual. The existing pump and reservoir are re-useable.

Throughout this application, various Patents and Applications are referenced by number and inventor. The disclosures of these documents in their entireties are hereby incorporated by reference into this specification in order to more fully describe the state of the art to which this invention pertains.

It is evident that many alternatives, modifications, and variations of the enhanced vehicle wiper blade of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST

10. Wiper Blade
11. Windshield Wiper
12. Cleaning Surfaces
14. Semicircular Tip
16. Cylindrical Channel
20. Nozzle
22. Integral Nozzles
28. Fluid Reservoir
30. Electric Pump
32. Fluid Tube
36. Fluid Heater
40. Valve 42. Quick Disconnect
44. Channel

We claim:

1. A wiper system for cleaning debris and stains from a surface being cleaned, said surface being cleaned being a windshield or headlight of a vehicle, said wiper system comprising:
a fluid reservoir for storing wiper cleaning solution;
a pair of cleaning edges for contacting said surface being cleaned;
a wiper including a hollow cavity extending into said wiper, said hollow cavity being in fluid communication with a plurality of nozzles, a tip being disposed between said pair of cleaning edges, said plurality of nozzles being disposed in said tip and along a length of said wiper;
a pump that applies pressure to said wiper cleaning solution, moving said wiper cleaning solution from said fluid reservoir into and through said wiper;
a fluid regulation valve that regulates the flow of said wiper cleaning solution flowing to said wiper; and
a fluid passageway in which said wiper cleaning solution is channeled from said fluid reservoir through said fluid regulation valve, said pump, to a fluid heating element, and to said wiper, said fluid heating element heating said wiper cleaning solution based upon ambient temperature, said fluid heating element delivering said cleaning solution vaporized to said surface being cleaned;
whereby said pair of cleaning edges and said tip form an inside surface having a generally semicircular cross section; and
whereby upon activation, said wiper cleaning solution is pulsed and vaporized into an area enclosed by said inside surface and across said surface being cleaned to remove any debris or stains therefrom.

2. The wiper system of claim 1, wherein said vaporized cleaning solution is steam at temperatures between 100° C. and 118° C.

3. The wiper system of claim 1, wherein said wiper is a rubber or rubber-like material, said wiper being essentially a same color as the vehicle.

4. The wiper system of claim 1, wherein said wiper system may be supplied either by an OEM or as an aftermarket system.

5. The wiper system of claim 1, wherein said plurality of nozzles are normally closed and said nozzles open as cleaning solution is circulated therethrough under pressure.

6. The wiper system of claim 1, wherein said plurality of nozzles are generally evenly spaced along said wiper length.

7. The wiper system of claim 1, wherein said vaporized cleaning solution is pulsed into said area and across said windshield or headlight at a rate of between 3 and 5 pulses per second.

8. The wiper system of claim 1, further comprising a quick disconnect of said wiper for ease of servicing or replacement.

9. The wiper system of claim 1, wherein a distance of any of said plurality of said nozzles to said windshield or headlight is between 3 and 4 mm.

10. The wiper system of claim 1, wherein said vaporized cleaning solution is pulsed onto said surface being cleaned, delivering a hammering action to remove said stains and debris from said windshield or headlight.

11. A wiper system for cleaning debris and stains from a windshield or headlight of a vehicle, said wiper system comprising:
a fluid reservoir for storing wiper cleaning solution;
a pair of cleaning edges for contacting said surface being cleaned;
a wiper including a hollow cavity extending into said wiper, said hollow cavity being in fluid communication with a plurality of nozzles, a tip being disposed between said pair of cleaning edges, said plurality of nozzles being disposed in said tip and along a length of said wiper, said nozzles being normally closed and said nozzles open as pressurized cleaning solution is circulated;
a pump that applies pressure to said wiper cleaning solution, moving said wiper cleaning solution from said fluid reservoir into and through said wiper;
a fluid regulation valve that which regulates the flow of said wiper cleaning solution flowing to said wiper; and
a fluid passageway in which said wiper cleaning solution is channeled from said fluid reservoir through said fluid regulation valve, said pump, to a fluid heating element, and to said wiper, said fluid heating element heating said wiper cleaning solution based upon ambient temperature, said fluid heating element heating delivering said cleaning solution vaporized to said windshield or headlight;
whereby said pair of cleaning edges and said tip form a space, said space having a cross section of a convex shape; and
whereby upon activation, said wiper cleaning solution is pulsed and vaporized into said space and across said windshield or headlight to remove any debris or stains therefrom.

12. The wiper system of claim 11, wherein said vaporized cleaning solution is steam at temperatures between 100° C. and 118° C.

13. The wiper system of claim 11, wherein said wiper is a rubber or rubber-like material, said wiper being essentially a same color as said vehicle.

14. The wiper system of claim 11, wherein said wiper system may be supplied either by an OEM or as an aftermarket system.

15. The wiper system of claim 11, wherein said vaporized cleaning solution is pulsed across said windshield or headlight at a rate of between 3 and 5 pulses per second.

16. The wiper system of claim 11, wherein said plurality of nozzles are normally closed and said nozzles open as cleaning solution is circulated therethrough under pressure.

17. The wiper system of claim 11, further comprising a quick disconnect of said wiper for ease of servicing or replacement.

18. The wiper system of claim 11, wherein said plurality of nozzles are generally evenly spaced along said wiper length.

19. The wiper system of claim 11, wherein a distance of any of said plurality of said nozzles to said windshield or headlight is between 3 and 4 mm.

20. The wiper system of claim 11, wherein upon activation, said vaporized cleaning solution is pulsed onto said windshield or headlight, delivering a hammering action to remove said stains and debris from said windshield or headlight.

* * * * *